United States Patent [19]

Usui et al.

[11] Patent Number: 5,515,204
[45] Date of Patent: May 7, 1996

[54] ZOOM LENS WHEREIN AT LEAST A PORTION OF THE ZOOM LENS MOVES FOR FOCUSING

[75] Inventors: Fumiaki Usui; Shigeru Oshima, both of Kanagawa, Japan

[73] Assignee: Canon Kabushiki Kaisha, Tokyo, Japan

[21] Appl. No.: 190,901

[22] Filed: Feb. 3, 1994

[30] Foreign Application Priority Data

Feb. 8, 1993 [JP] Japan ..................... 5-043272

[51] Int. Cl.$^6$ .................................. G02B 15/14
[52] U.S. Cl. .................. 359/684; 359/683; 359/688
[58] Field of Search .................... 359/689, 684, 359/683, 688, 676

[56] References Cited

U.S. PATENT DOCUMENTS

| | | | |
|---|---|---|---|
| 4,083,057 | 4/1978 | Quinn | 354/25 |
| 4,752,121 | 6/1988 | Kitagishi | 359/684 |
| 4,848,883 | 7/1989 | Maruyama | 359/684 |
| 5,059,007 | 10/1991 | Tanaka | 359/684 |
| 5,272,564 | 12/1993 | Suzuki et al. | 359/684 |

Primary Examiner—Scott J. Sugarman
Attorney, Agent, or Firm—Fitzpatrick, Cella, Harper & Scinto

[57] ABSTRACT

A zoom lens wherein a portion of the zoom lens moves for focusing has, from front to rear, a first lens unit of positive refractive power, at least a rear lens part of the first lens unit being moved to effect focusing. A plurality of lens units are provided to effect zooming, and these lens units move along an optical axis. Focusing from an infinitely distant object to an object at a minimum distance is performed by (i) moving the at least rear lens part forward, and (ii) moving one movable lens unit of the plurality of lens units forward into a space vacated by the rear lens part moving forward.

6 Claims, 5 Drawing Sheets

WIDE-ANGLE SETTING WHEN AT INFINITY

WIDE-ANGLE SETTING WHEN AT M.O.D.

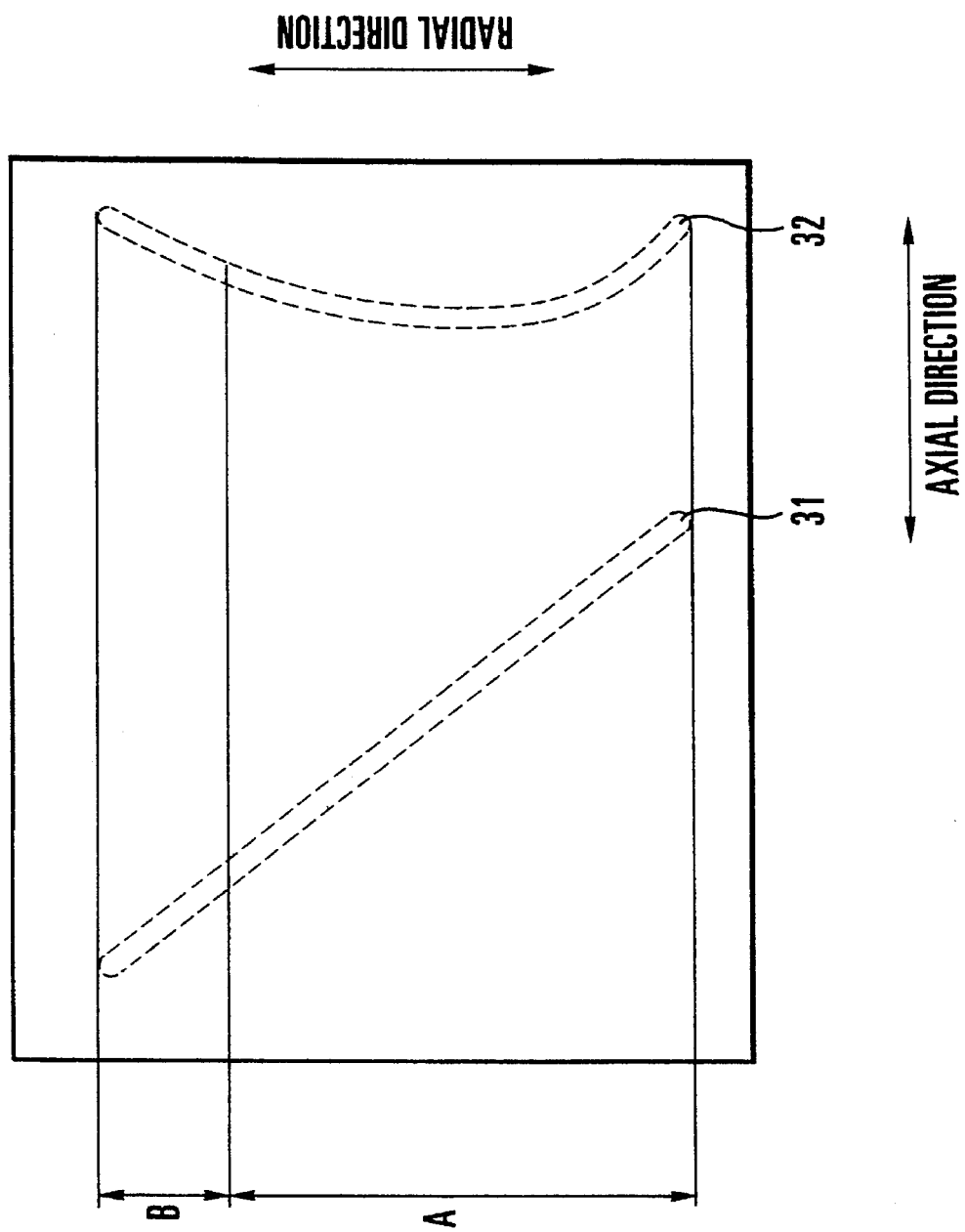

ZOOM LOCI FOR INFINITY

ZOOM LOCI FOR M.O.D.

ZOOM LENS WHEREIN AT LEAST A PORTION OF THE ZOOM LENS MOVES FOR FOCUSING

BACKGROUND OF THE INVENTION

1. Field of the Invention

The present invention relates to zoom lenses capable of compensating for the change of the angle of field of view due to focusing and, more particularly, to zoom lenses of which at least a part of the front lens members constituting a first lens unit, when counted from the object side, is used for focusing, wherein the change of the image angle resulting from the focusing is corrected by utilizing a part of the zoom section in part (variator) while still maintaining the high zoom ratio.

2. Description of the Related Art

The recent trend in the field of color television cameras for broadcasting is to lay emphasis on handling and manageability. To assist in fulfilling this demand, the image pickup device has been reduced in size. So, the use of small-sized CCD (solid-state image sensor) to, for example, ⅔ or ½ inch comes to a main stream. With the help of this, it becomes easy to achieve much desired reduction of the size and weight of the entirety of the camera system.

Along with this has even come a corresponding demand for zoom lenses to be used in the color television camera for broadcasting. So, attempts have been made to reduce the bulk and size and the weight of the zoom lens and, at the same time, to provide the zoom lens with higher specific capabilities.

Among others, to shorten the distance representing how close the television camera can approach an object being shot ahead thereof, i.e., the so-called M.O.D. (Minimum Object Distance) is coming to be one of the important elements on the specification of the zoom lens to be used in the color television camera for broadcasting and on its imaging effect.

However, as this M.O.D. is shortened, the problem that the image angle (the angle of field of view) varies with focusing becomes serious. This is particularly prominent in the type of zoom lens which employs the focusing method using the first lens unit, when counted from the object side, (or the front lens members).

Such a variation of the image angle is in principle based on the following reason. Although the front lens members axially move in part or as a whole, an object point for the subsequent zooming lens unit, or the variator, is maintained in a constant position.

With this, when the object distance changes, or the focusing lens moves forward, the lateral magnification of the front lens members is caused to change. As a result, the lateral magnification of the entire system of the zoom lens changes, which induces a change of the image angle.

For the zoom lens employing this front focus method, it optically happens in the wide-angle positions that the forward movement of the focusing lens, because of little changing of the degree of focus, makes only the change of the image angle to be appreciable. For this reason, a problem arises in that when a change of the image angle due to focusing occurs, it is perceived as if zooming were done.

So, in, for example, U.S. Pat. No. 4,083,057, there has been proposed a device for preventing such change of the image angle from taking place by making movable the zoom section. For example, the lens unit for varying the focal length (variator) is chosen to compensate for the change of the lateral magnification of the entire system of the zoom lens resulted from focusing. For this purpose, the variator is arranged to vary its lateral magnification independently. Thus, the change of the image angle due to focusing is corrected.

In application to a zoom lens comprising, from front to rear, a focusing lens unit (front lens members), a zooming lens unit for varying the focal length (variator), another zooming lens unit (compensator) and an image forming lens unit (relay lens), or the so-called 4-unit zoom lens, it is, however, manifest in the general case that when, for example, in the wide angle positions, the front lens members form an image point very far from an axial position of the variator and this is disadvantageous from the standpoint of correcting the change of the image angle due to focusing. For this reason, if the variator is used in varying the lateral magnification of the entire system, the required amount of correcting movement of the variator becomes very large. This gets even more prominent as the maximum image angle increases, or the zoom lens is a wide-angle one.

Usually, in the 4-unit zoom lens, the wide-angle end becomes a zooming position that puts the front lens unit and the variator at a closest distance from each other. For this reason, to ensure a sufficient space in which the variator moves to compensate for the change of the image angle in that zooming position or the wide-angle end, there is a need to make sure that the interval between the principal points of the front lens unit and the variator be made wider than is usually necessary. An alternative measure is to sacrifice the reduction of the shortest focal length of the entire system.

However, the increase of the interval between the principal points of the front lens unit and the variator calls for an increase of the diameter of the front lens members, giving rise to a problem that the camera apparatus as a whole gets larger in size and heavier in weight.

Also, if the reduction of the shortest focal length is sacrificed, leaving it long, another problem arises in that it becomes impossible for the zoom lens in itself to achieve widening of the maximum image angle and increasing of the zooming range.

Meanwhile, zoom lenses for the color television cameras for broadcasting have, in most cases, zoom ratios of 10 or above. Again, as compared with the zoom lenses for video cameras for home use, they have a wider maximum image angle. In addition, for the wide-angle end, they produce an optical effect that, while the F-number is very luminous, the depth of field becomes deeper.

As a result, the change of the image angle with focusing falls within the depth of focus, leaving the image sensed by the pickup means as not in a defocused state. For the picture composition the photographer intends, on the other hand, a discrepancy is formed to the taken image angle, thus giving rise to a problem. For this reason, the fact that the image angle varies with focusing has been said to be unfavorable to the photographer.

SUMMARY OF THE INVENTION

The present invention employs a focusing method which is to move a lens part including the rearmost lens surface in the front or first lens unit so that the image angle changed by focusing is corrected with high efficiency by an optical system of the second lens unit (variator) and the subsequent one or ones. It is, therefore, an object of the invention to provide a zoom lens which enables a high zoom ratio to be obtained and also the maximum image angle to be widened with ease and is suited particularly to the color television camera for broadcasting.

In a preferred embodiment of the invention, the zoom lens comprises, from front to rear, a first lens unit of positive refractive power which remains stationary during zooming, a second lens unit for varying the focal length, a third lens unit for compensating for the image shift with zooming and a fourth lens unit having the image forming function, wherein either the entirety of the first lens unit or a lens member which includes the rearmost lens surface in the first lens unit is used as a focusing lens, and the focusing lens is arranged to axially move toward the object side when focusing from an infinitely distant object to shorter object distances, and wherein the second lens unit is made responsive to focusing movement in such a way that for at least the wide-angle positions, the second lens unit moves into the space which becomes vacant after the focusing lens has moved away therefrom forward.

In a particular case, the third and/or fourth lens units are made to move at least partly in response to movement of the focusing lens and the second lens unit to thereby maintain the constant position of the image plane.

BRIEF DESCRIPTION OF THE DRAWINGS

FIG. 3 is an expanded view used to explain the cam tube having a curved cam slot shown in FIG. 1.

DETAILED DESCRIPTION OF THE PREFERRED EMBODIMENT

Figure 1:
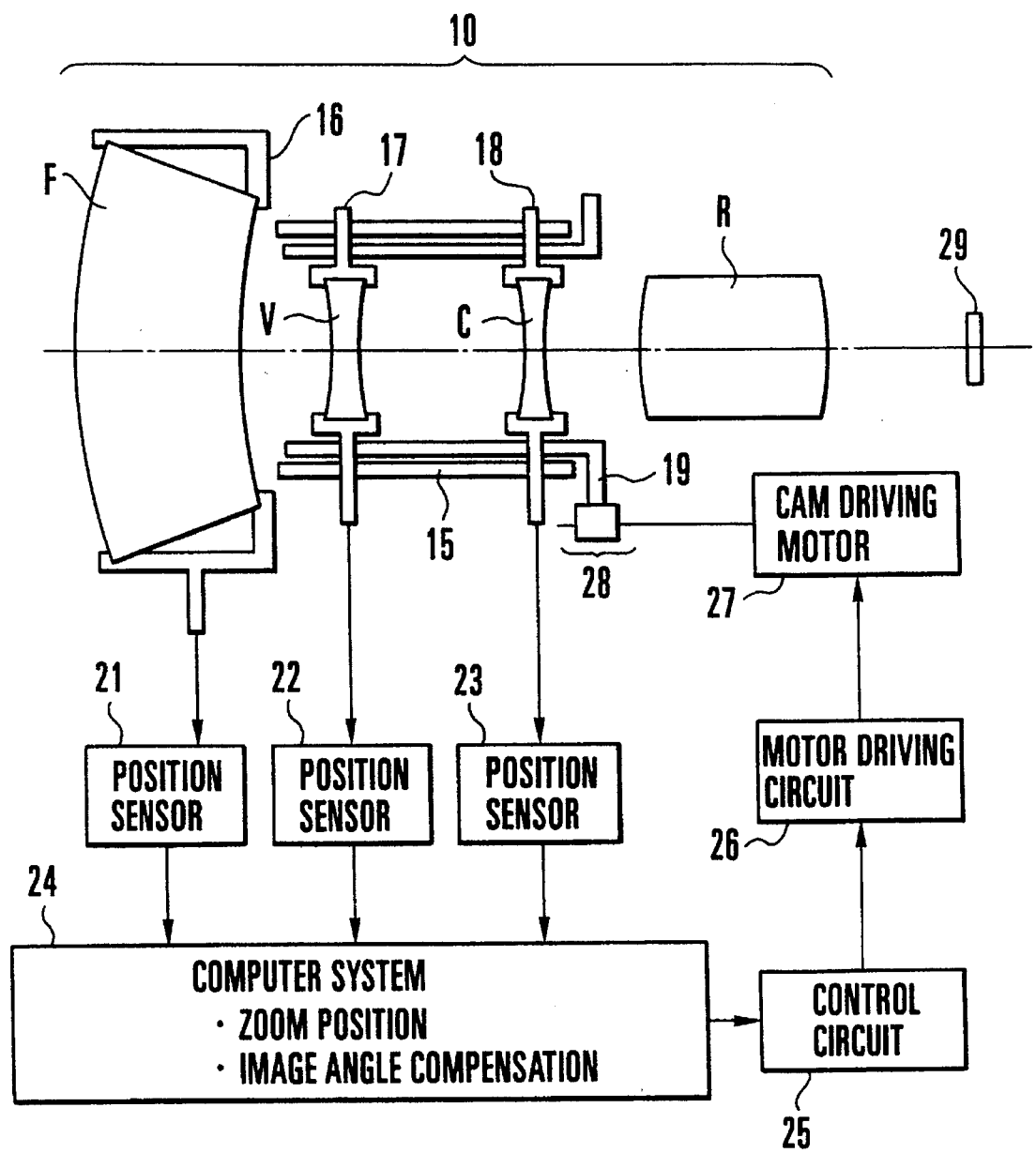
FIG. 1 is a schematic diagram of an embodiment of a zoom lens with the main parts of an operating mechanism therefor according to the invention.
Figure 2A:
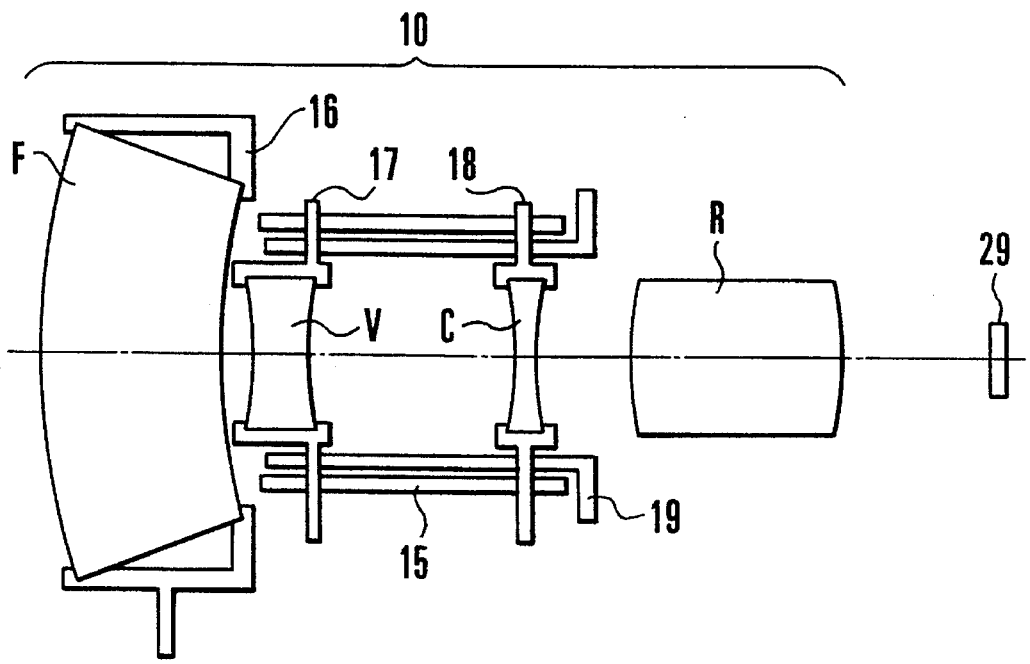
FIGS. 2(A) and 2(B) are diagram used to explain part of FIG. 1, with FIG. 2(A) showing an arrangement of the lens blocks when the object distance is infinite and FIG. 2(B) showing another arrangement of the lens blocks when the object distance is minimum.
Figure 2B:
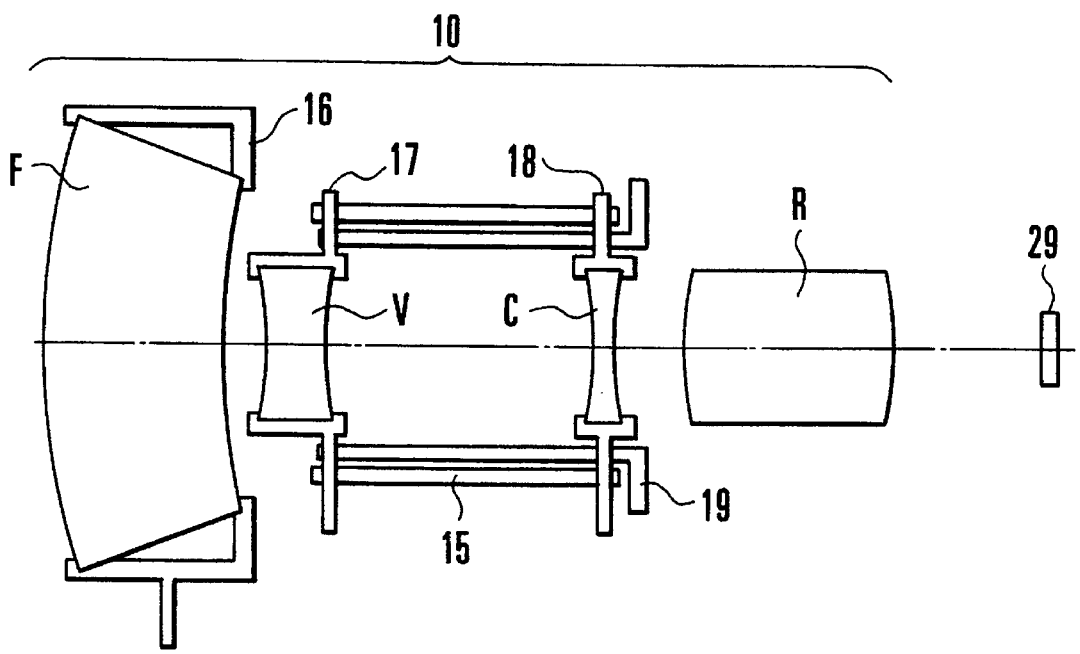
Figure 4A:
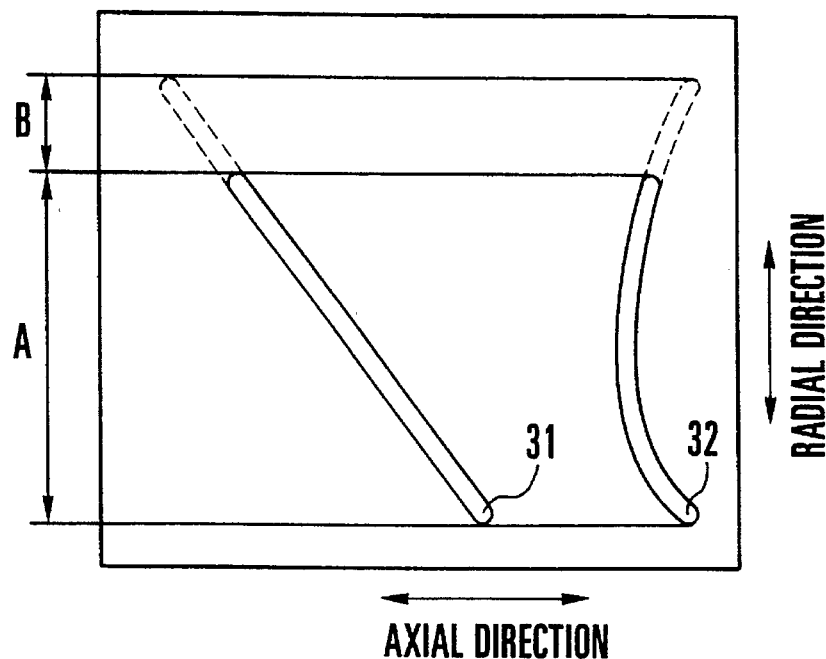
FIGS. 4(A) and 4(B) are expanded views used to explain the cam tube having a curved cam slot shown in FIGS. 2(A) and 2(B), with FIG. 4(A) showing the loci of camming motion when the object distance is infinite and FIG. 4(B) showing the loci of camming motion when the object distance is minimum.
Figure 4B:
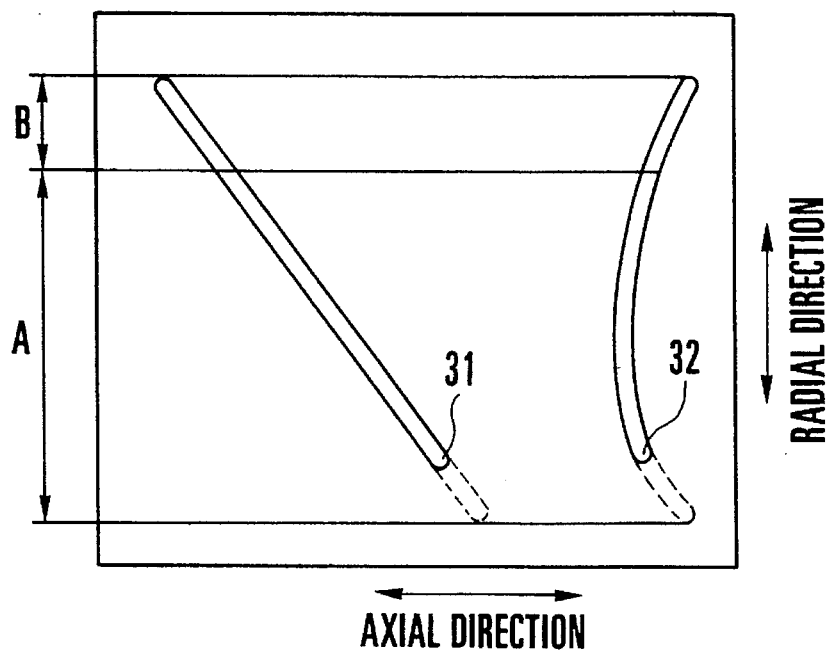
Figure 5:
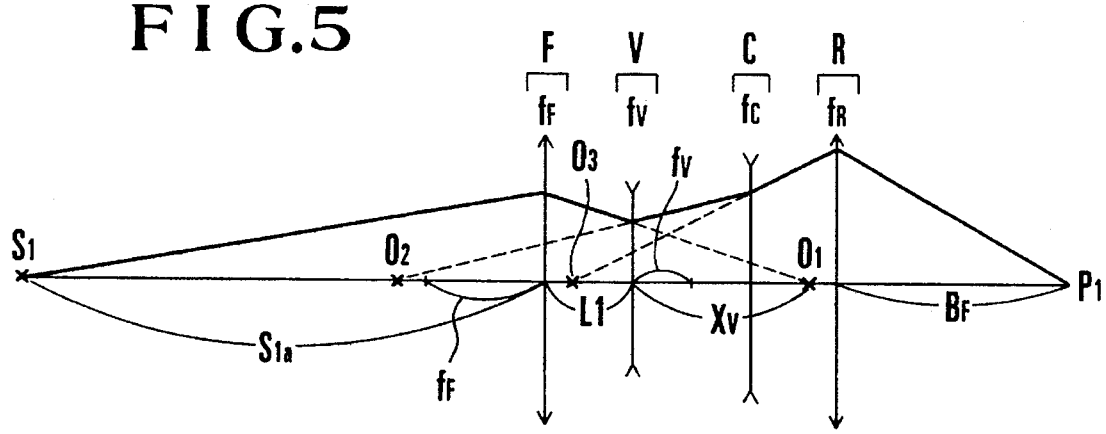
FIG. 5 is a diagram of geometry used to explain the paraxial refractive power arrangement of the embodiment of the invention.
Figure 6:
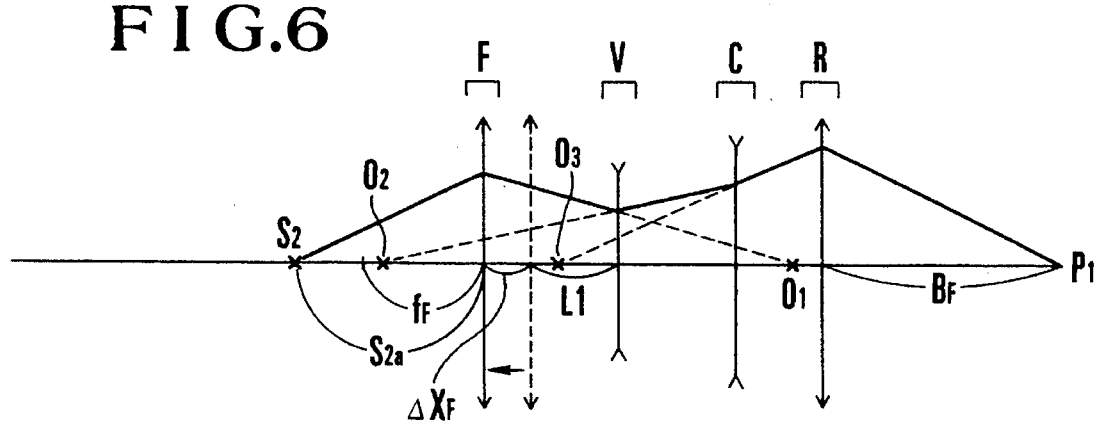
FIG. 6 is a diagram of geometry used to explain the paraxial refractive power arrangement of the embodiment of the invention.
Figure 7:
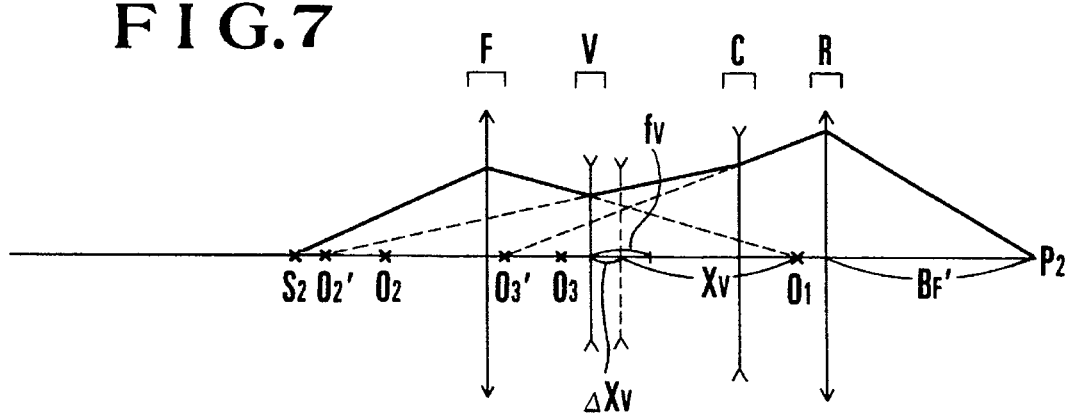
FIG. 7 is a diagram of geometry used to explain the paraxial refractive power arrangement of the embodiment of the invention.

FIG. 1 schematically shows the main parts of one embodiment of a zoom lens according to the invention. The zoom lens with part of the operating mechanism of FIG. 1 is shown in the wide-angle end with an object at infinity in FIG. 2(A), and with an object at the minimum object distance in FIG. 2(B). The cam tube having the curved cam of FIGS. 2(A) and 2(B) is shown in expanded form in FIG. 3 and FIGS. 4(A) and 4(B). FIG. 4(A) shows the loci of camming motion for an infinitely distant object, and FIG. 4(B) shows those for an object at the minimum distance. FIGS. 5 to 7 show variation of the paraxial refractive power arrangement of the zoom lens of the invention.

In FIG. 1, F denotes the front lens unit constituting the first lens unit (whose focal length=$f_F$) of positive refractive power which remains stationary during zooming. As a focusing lens, use is made of the first lens unit either entirely or partly with the ones of the lens members which include the rearmost lens surface in the first lens unit. In this embodiment, the first lens unit is axially moved as a whole to effect focusing. To focus from an infinitely distant object to shorter object distances, the focusing lens F moves toward the object side.

A second lens unit V functions to vary the focal length, thus constituting a variator (whose focal length= $f_V$) of negative refractive power. As the variator V moves axially toward the image side, the focal length varies from the shortest (wide-angle end) to the longest one (telephoto end). It is the variator V that moves toward the object side in relation to the forward movement of the focusing lens F as focusing is carried out to shift from an infinitely distant object to an object at the minimum distance. Particularly in the wide-angle positions, the variator V occupies the space out of which the focusing lens F has departed. In such a manner, the space that allows the variator V to move is formed with high efficiency, and the changed image angle due to focusing is corrected.

A third lens unit is the compensator C (whose focal length=$f_C$) of negative refractive power. To compensate for the shift of the image plane with zooming, the compensator C moves non-linearly along the optical axis, while depicting a locus convex toward the object side.

In the present embodiment, the compensator C, during focusing, moves axially in certain directions in operative connection with the focusing lens F and the variator V. Thus, the image plane is maintained at the constant position.

A fourth lens unit is the relay lens R (whose focal length=$f_R$) of positive refractive power having the image forming function. An image sensor 29 is comprised of, for example, CCD and others.

In such a zoom lens, when the object distance varies, the paraxial refractive power arrangement over all the optical elements varies. This is explained by using FIGS. 5 to 7 below.

FIG. 5 shows the paraxial refractive power arrangement for an arbitrary object distance in some focal length (zooming) position.

In FIG. 5, an object at a point $S_1$ emits rays of light which are focused by the front lens members F to form an image (object image) at a point $O_1$. This image point $O_1$ becomes an object point for the variator V. The variator V in turn forms an image at a point $O_2$. Similar to this image point $O_2$, the compensator C forms an image at a point $O_3$. For this image point $O_3$, the relay lens R forms an image on the image plane (focal plane) $P_1$.

By the optical process described above, the object point $S_1$ is imaged on the focal plane $P_1$ by a certain magnification.

Here, suppose the object now changes its distance to a shorter one as from the point $S_1$ to a point $S_2$ as shown in FIG. 6, then the front lens members F have to move forward by an amount $\Delta X_F$ that allows an image of the object at the point $S_2$ to be focused on the point $O_1$, so that the zoom lens as a whole maintains constant the position of sharp focus (the position of the image plane).

During this time, the position of the image point $O_1$ and the axial positions of the variator V and the compensator C are kept unchanged. Therefore, the image points $O_2$ and $O_3$, too, do not change their positions. For this reason, the position of the image plane $P_1$ and the lateral magnifications $\beta_V$, $\beta_C$ and $\beta_R$ of the variator V, the compensator C and the relay lens R are also constant.

In other words, the change of the image angle of the whole zoom lens due to focusing is influenced only by the lateral magnification $\beta_F$ of the front lens unit F.

Here, as the object moves from the point $S_1$ to the point $S_2$, the front lens unit F changes its lateral magnification $\beta_F$ by an amount $\Delta\beta_F$ given by the following expression:

$$\beta_{F1} = f_F/(S_{1a} - f_F)$$

$$\beta_{F2} = f_F/(S_{2a} - f_F)$$

$$\therefore \Delta\beta_F \beta_{F2}/\beta_{F1} = (S_{1a} - f_F)/(S_{2a} - f_F)$$

where $\beta_{F1}$ and $\beta_{F2}$ are the lateral magnifications of the front lens unit F at the object distances $S_{1a}$ and $S_{2a}$, respectively.

Thus, all that is required for compensating for the change of the image angle with focusing is only to cancel this changed amount $\Delta\beta_F$ of the lateral magnification $\beta_F$ of the front lens unit F by an optical system of the variator V and those that follow.

So, in the embodiment of the invention, means is provided for this compensation by moving the variator V forward by the amount of compensating movement $\Delta X_V$ with a change of the lateral magnification $\beta_V$ of the variator V. By this, the changed amount $\Delta\beta_F$ of the lateral magnification $\beta_F$ of the front lens unit F is canceled so that the lateral magnification of the whole zoom lens remains constant throughout the entire range of object distances.

In this instance, for the moved amount $\Delta X_V$ of the variator V, the following relationship is established:

$$(1/\Delta\beta_F) \times (f_V/(X_V - f_V)) = F_V/((X_V + \Delta X_V) - f_V)$$

Hence, $$\therefore \Delta X_V = (\Delta\beta_F - 1)(X_V - f_V) \qquad (1)$$

By moving the variator V forward to the amount $\Delta X_V$, therefore, for the image point $O_1$ of the front lens unit F, the variator V forms an image at a point $O_2'$. Likewise for this image point $O_2'$, the compensator C forms an image at a point $O_3'$.

As a result, the zoom lens including up to the relay lens R, or the complete zoom lens, changes its back focal distance $B_F$ to a back focal distance $B_F'$. In the embodiment of the invention, therefore, the compensator C is moved axially in such a direction that the image point $O_3'$ is brought into coincidence with the image point $O_3$ (which was taken before the variator V moves). Thus, the compensation is carried out in such a manner that the back focal distance remains constant at $B_F$ over the entire focusing range.

It should be pointed out in this connection that instead of the compensator C, the relay lens R may otherwise be moved at least in part with a lens member RR along the optical axis so as to maintain the constant back focal distance. Another example of modification is that both of the compensator C and the lens member RR may otherwise be moved.

With the foregoing discussion in mind, a method of compensating for the change of the image angle with focusing according to the invention is next explained.

In the embodiment of the invention, as the focusing lens F, use is made of the front lens unit either as a whole, or some lens members including the rearmost lens surface in the front lens unit. Further, it is toward the object side that the focusing lens unit F moves as focusing is effected to shorter object distances. In other words, the front focusing method of the character described above is employed.

In the present embodiment applied to the zoom lens 10 comprising the four lens units, namely, the front lens unit F, the variator V, the compensator C and the relay lens R, letting the lateral magnifications of the lens units F, V, C and R be denoted by $\beta_F$, $\beta_V$, $\beta_C$ and $\beta_R$, respectively, the changed lateral magnification $\beta_F$ of the front lens unit F by, for example, changing the object of principal interest with change of the object distance, and moving the focusing lens F toward the object side, is corrected by axially moving the variator V under the following condition:

$$\beta_F \times \beta_Z = \text{constant (where } \beta_Z = \beta_V \times \beta_C \times \beta_R)$$

over the entire range of object distances. Thus, the lateral magnification $\beta_V$ of the variator V is changed so that the lateral magnification of the whole zoom lens becomes always constant.

In addition, because such movement of the variator V changes the back focal distance $B_F$, it is, therefore, in the present embodiment that the compensator C (or the relay lens R) is moved axially in a certain direction in response to movement of the focusing lens F and the variator V in order that $$B_F = \text{constant}$$

is always established. In such a manner, the changed image angle changed by focusing is corrected without giving a bad influence such as that of shifting the image plane.

Another feature of the invention is to make provision such that, for the zooming position at the wide-angle end where the air separation L1 between the front lens unit F and the variator V is shortest, when the focusing lens F moves forward, the variator V moves forward, thus following up the focusing lens unit F. That is, in the wide-angle end, the variator V moves into the space the focusing lens unit F has left as the latter moves forward.

For this purpose, such movement of the variator V is controlled by a control circuit 25 so that the equation (1) described before and the following inequality for the amount of forward movement $\Delta X_V$ of the variator V are satisfied:

$$\Delta X_V < \Delta X_F + L1 \qquad (2)$$

where $\Delta X_F$ is the amount of forward movement of the focusing lens F.

This permits good correction of the changed image angle by focusing without having to widen the principal point interval between the front lens unit F and the variator V, or to sacrifice the shortened focal length for the wide-angle end, and further without causing the front lens unit F and the variator V to interfere with each other mechanically at any station within the entire range of object distances.

Next, an explanation is given of a series of operations in a process for compensating for the change of the image angle over the entire focusing range by reference to FIG. 1.

In FIG. 1, the front lens unit F, the variator V and the compensator C are supported in respective support members 16, 17 and 18, respectively. The support members 17 and 18 are operatively connected to a linear cam 15 and a curved cam 19. Zooming is performed by rotating the curved cam 19. The axial positions of the support members 16, 17 and 18 are detected by sensors 21, 22 and 23, respectively. The output signals from these position sensors 21, 22 and 23 are applied to a computer system 24.

In the computer system 24, the current zoomed positions of the variator V and the compensator C are computed with the moved amount of the front lens unit F to determine the value of correction for the changed image angle. Its output signal is applied to a control circuit 25.

Responsive to this, the control circuit 25 puts signals representing the direction and amount in and by which the lens units V and C are to move for correcting purposes into a drive circuit 26 for an electric motor 27. The motor 27 is rotated, which in turn rotates the curved cam 19 through a gear 28.

In the curved cam 19, there are provided two camming slots 31 and 32. The camming slot 31 forms a locus for the variator V, and the camming slot 32 for the compensator C.

Here, for an infinitely distant object, a region A of the range of movement (cam locus) shown in FIG. 3 is used in varying the focal length as shown in FIG. 4(A). A focusing is then effected to shorter object distances, the front lens unit F moves forward. With this, that part of the camming slots used in varying the focal length is shifted to the direction of the region B as shown in FIG. 4(B) as is controlled by the control circuit 25.

Such shift of the range of zooming movement to the region B causes the axial position of the variator V to change (move) even more forward as the object distance decreases. In this connection, it is to be noted that particularly in the wide-angle positions, the variator V moves into the space the focusing lens F has left forward. To this end, the form of the camming slot 31 is adjusted.

By this, the changed image angle by focusing is well corrected in such a manner that, as has been described above, the interval between the principal points of the front lens unit F and the variator V is not widened, or the shortest focal length is not sacrificed.

Also, the camming slot 32 for the compensator C is extended to the region B for the purpose of correcting the changed back focal distance by the movement of the variator V in the wide-angle positions.

It will be appreciated from the foregoing that in the embodiment of the invention, as the object distances decrease from infinity to shorter ones, not only the focusing lens F moves forward, but also the variator V is moved forward in response to focusing. Further, the camming slot is so constructed that in the wide-angle end, the variator V moves into the space the focusing lens F has left forward. This ensures that the predetermined zoom ratio is obtained, while still permitting the changed image angle by focusing to be corrected well.

While the foregoing embodiment has been described in connection with the mechanical cam members for moving the variator and compensator, it is to be understood that the invention is applicable to another type of drive mechanism employing electronic cams for driving the variator and the compensator independently of each other.

It is also possible to apply this principle to the inner focus type of zoom lens in which the front lens unit is partly moved with inclusion of the last front lens member.

According to the invention, because, as the object distance decreases from infinity to shorter object distances, the forward movement of the focusing lens is accompanied with such movement of an optical system of the second lens unit (variator) and those that follow, it is made possible to correct the changed image angle by focusing in such a manner that the zoom ratio is not reduced. Hence, the zoom lens of the present invention can widen the maximum image angle with great advantages.

What is claimed is:

1. A zoom lens comprising:

from front to rear, a first lens unit of positive refractive power, at least a rear lens part of said first lens unit being moved to effect focusing; and a plurality of lens units moving along an optical axis to effect zooming, wherein focusing from an infinitely distant object to an object at a minimum distance is performed by (i) moving said at least a rear lens part forward, and (ii) moving one movable lens unit of said plurality of lens units forward into a space vacated by said at least a rear lens part moving forward.

2. A zoom lens according to claim 1, wherein said plurality of lens units includes, from front to rear, a second lens unit of negative refractive power serving as said movable lens unit and a third lens unit.

3. A zoom lens according to claim 2, further comprising a fourth lens unit which remains stationary in rear of said third lens unit.

4. A zoom lens according to claim 1, wherein said movable lens unit moves into said space when said zoom lens is in a wide-angle end.

5. A zoom lens according to claim 1, wherein said plurality of lens units include another movable lens unit arranged to move together with said movable lens unit.

6. A zoom lens according to claim 5, wherein said another movable lens unit is located just behind said movable lens unit.

* * * * *

UNITED STATES PATENT AND TRADEMARK OFFICE
CERTIFICATE OF CORRECTION

PATENT NO. : 5,515,204
DATED : May 7, 1996
INVENTOR(S) : USUI, et al

It is certified that error appears in the above-indentified patent and that said Letters Patent is hereby corrected as shown below:

<u>Column 3,</u>

Line 30, "diagram" should read --diagrams--.

<u>Column 5,</u>

Line 13, $$\beta_{F2} = f'_P (S - 2\alpha = f_P)$$

should read --

$$\beta_{F2} = f_P / (S - 2a - f_P)$$

--; and

UNITED STATES PATENT AND TRADEMARK OFFICE
CERTIFICATE OF CORRECTION

PATENT NO. : 5,515,204
DATED : May 7, 1996
INVENTOR(S) : USUI, et al

It is certified that error appears in the above-indentified patent and that said Letters Patent is hereby corrected as shown below:

Column 5,

Line 14,

should read --

$$\therefore \Delta \beta_F = \beta_{F2} / \beta_{F1} = (S_{1a} - f_F) / (S_{2a} - f_F)$$

Signed and Sealed this

Seventeenth Day of September, 1996

*Attest:*

BRUCE LEHMAN

*Attesting Officer*      *Commissioner of Patents and Trademarks*